Oct. 20, 1931.  H. D. GEYER  1,828,402
FLEXIBLE CONNECTER
Filed April 3, 1928

Inventor
Harvey D. Geyer
By Spencer Hardman & Fehr
his Attorney

Patented Oct. 20, 1931

1,828,402

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

FLEXIBLE CONNECTER

Application filed April 3, 1928. Serial No. 266,938.

This invention relates to connecters having non-metallic elastic material interposed between metal parts so as to break the metallic connection between the members connected by said connecters. The general object of this invention is to provide a simple, efficient, and very economically made isolating connecter which is especially adapted for isolatingly mounting various parts of an automotive vehicle, such, for instance, as engine mounts, radiator mounts, spring connecters, or connecters for attaching in place body parts which have a tendency to vibrate or rattle such as fenders, running boards, etc., or for connecting the automobile body to the chassis frame.

A special object of this invention is to provide a form of isolating connecter which can be simply made primarily of pressed metal parts and elastic rubber material and hence the cost of manufacture is very low due to the fact that little or no machining of the parts is required.

Another object is to provide a connecter whose parts are held permanently assembled together by a punch press operation and therefore they cannot become disadjusted by accident or be tampered with an unknowing person and hence danger of failure is eliminated.

Another object is to provide such a connecter which can be economically made in a wide range of sizes, that is to say, due to the method of pressing the metal cups from sheet metal and the method of assembling the parts by crimping over the outer metal cup the connecter can be so economically made in very small sizes that it can be suitably used in place of small screws or bolts for such purposes as mounting the fenders and running boards upon the chassis frame.

Further objects and advantages of the present invention will be apparent from the following description, reference being had to the accompanying drawings, wherein a preferred form of embodiment of the present invention is clearly shown.

Figure 1:
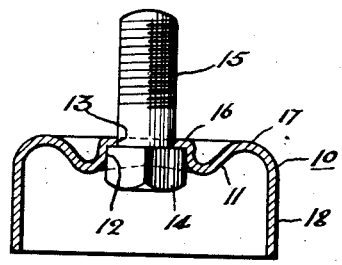
Fig. 1 is a vertical section through the outer metal cup of a connecter built according to this invention.

Similar reference characters refer to similar parts through the several views. Numeral 10 designates the circular outer metal cup which is preferably pressed up from suitable deep-drawing flat sheet steel, as will be readily understood by those skilled in the art. This relatively shallow cup 10 has its bottom wall 11 pressed inwardly as shown clearly in Figs. 1 and 3 and provided with a hexagon shaped central recess 12 into which the hexagon head 14 of the bolt 15 snugly fits. The shank of bolt 15 extends through the central aperture 13 in the recess 12. Preferably the outer surface 16 of the wall of recess 12 lies flush with the outer surface 17 near the periphery of cup 10 so as to give a flat seating surface for cup 10 to be clamped rigidly upon the member to which it is to be attached by the bolt 15.

Figure 2:
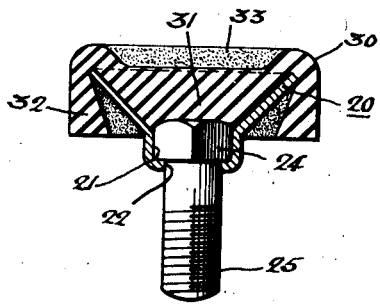
Fig. 2 is a similar vertical section through the lower metal cup and the molded elastic rubber block slipped thereupon, showing the shape of the rubber block as molded.
Figure 3:
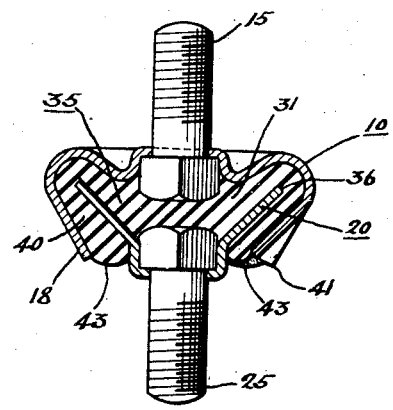
Fig. 3 is a vertical section through the finished connecter, showing how the rubber block is distorted and put under compression by the closing in of the outer cup walls.
Figure 5:
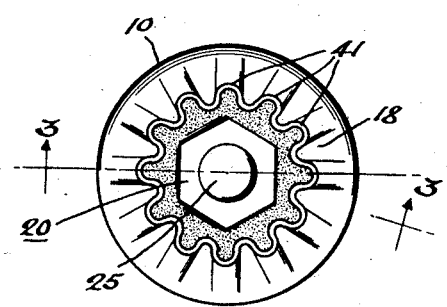
Fig. 5 is a bottom view of the finished connecter, showing how the outer cup walls have been closed in by a corrugated crimping.
Figure 4:
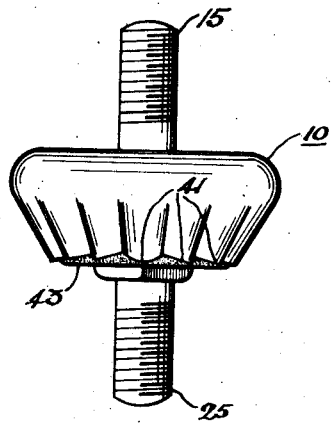
Fig. 4 is a side elevation of the finished connecter.

The conical shaped inner cup 20 is also preferably pressed up from suitable flat sheet steel to the shape clearly shown in Figs. 2 and 3. This inner cup 20 also has a hexagon shaped central recess 21 pressed therein into which the hexagon head 24 of the attaching bolt 25 fits snugly. The shank of bolt 25 extends through a central aperture 22 in recess 21.

The non-metallic elastic material used with this connecter is preferably a block 30 of soft rubber molded to the shape clearly shown in Fig. 2. This molded block 30 comprises a central conical portion 31 molded substantially to the shape of the conical metal cup 20, and a peripheral dove-tail annular portion 32 which extends around on the outside of cup 20 but which can be easily flexed or extended to permit the rubber block 30 to be snapped in place over the metal cup 20 to the position shown in Fig. 2. The outer diameter of block 30 is such as to fit snugly within the outer metal cup 10.

Now to permanently assemble the connecter parts, the bolts 15 and 25 are first slipped into their positions as shown in Figs. 1 and 2, the soft rubber block 30 is snapped over the inner cup 20 as shown in Fig. 2 thus holding bolt 25 against falling out when this sub-assembly is inverted, and this sub-assembly is then inserted downwardly into the inverted outer cup 10 until the bolt head 14 limits this insertion by engaging the rubber surface of the central depression 33. The two metal cups 10 and 20 are then forced toward one another to initially compress the rubber portion 31 (which will then be located in a pocket 35 between the opposed cups 10 and 20) and to cause the elastic rubber to completely fill all crevices about the bolt heads 14 and 24 and to flow in some degree around the circular lip 36 into the dove-tail annular space 40 between the inner cups 20 and the side walls 18 of the outer cup 10. Now while these cups are so held forced together the side walls 18 of cup 20 are closed in radially upon the rubber in annular space 40, preferably by a suitable tapered and corrugated die which will form the substantially uniform small corrugations 41 in the side walls 18 and so permit the diameter at the lip of cup 10 to be greatly reduced. This assembly operation can be very conveniently and quickly done upon a die press as will be readily understood by those skilled in the art. It will be obvious from Fig. 3 that this inward crimping of side walls 18 will highly compress the annular rubber flange 32 and cause it to flow or bulge out and completely fill the space 40. Preferably the volume of rubber in flange 32 as originally molded (see Fig. 2) is such that when the side walls 18 are crimped over as above described, the rubber will bulge slightly beyond the edge of side walls 18 as at 43 and hence prevent any crevice where dirt or other foreign substance may lodge and work its way into the rubber to cause rapid deterioration thereof. The corrugations 41 in the crimped side walls 18 greatly strengthen the same and enable them to securely hold the metal cups 10 and 20 forced together and the soft rubber 30 under high initial compression at all times during use.

In operation, the connecter has the outer metal cup 10 rigidly clamped by bolt 15 to one of the members (not shown) to be connected by said connecter and the inner metal cup 20 rigidly clamped by bolt 25 to the other member to be connected. It will be clear that these two connected members will be completely isolated from each other by the soft rubber block 30 and yet they will be very securely connected together by an elastic universal joint which can yield slightly in all directions. Vibrations will thus be damped out and all rattling at the connection absolutely prevented. The connecter is completely and permanently assembled at the time of manufacture and can be readily secured to the connected parts by the bolts 15 and 25 which may have lock washers and nuts thereupon as ordinary bolts or they may be used as ordinary stud bolts. As stated hereinabove the sizes and uses of this connecter may greatly vary, however the form herein chosen as an illustration of the invention is adapted for use as an engine mount for automobile engines whereby transmission of vibrations and noise from the engine to the chassis frame is minimized.

While the form of embodiment of the present invention, as herein disclosed, constitutes a preferred form, it is to be understood that other forms might be adopted, all coming within the scope of the claims which follow.

What is claimed is as follows:

1. A yieldable connecter comprising: a metal casing having means for attachment thereto, a metal head inserted within said casing in interlocked relation therewith and having means for attachment thereto projecting through an opening in said casing, and soft rubber material under high compression within said casing and isolating said head therein, said high compression causing said rubber to flow materially outwardly adjacent said opening, whereby variation in the outward bulging of the rubber under variation in applied load is resisted.

2. A connecter for yieldably connecting two members comprising: a pressed metal cup having means for fixing to one of said members, a metal head inserted within said cup and having means for fixing to the other of said members, and soft rubber isolating said head and cup and held highly compressed between said head and cup by an inward deformation of the edges of said pressed metal cup to overlie said metal head therein.

3. A connecter for yieldably connecting two members comprising: a pressed metal cup having means for fixing to one of said members, a metal head inserted within said cup and having means for fixing to the other of said members, and soft rubber material held highly compressed between said head and cup by a radial contraction of the side walls of said cup.

4. A connecter for yieldably connecting two members comprising: a pressed metal cup adapted to be fixed to one of said members, an outwardly flaring metal head inserted within said cup and adapted to be fixed to the other of said members, and elastic material isolating said head and cup and held highly compressed within said cup by an inward deformation of the periphery of said cup.

5. A connecter for yieldably connecting two member comprising: a pressed metal cup adapted to be fixed to one of said members, a conical shaped metal head inserted within said cup and adapted to be fixed to the other of said members, and elastic material isolating said head and cup and held compressed within said cup by an inward deformation of the periphery of said cup.

6. A connecter for yieldably connecting two members comprising: a substantially circular metal cup having a shank projecting therefrom for fixing to one of said connected members, a conical metal head inserted within said cup in spaced relation therewith and having a shank projecting from the opening in said cup for fixing to the other of said connected members, and elastic material isolating said head and cup and held compressed therebetween by an inward deformation of the periphery of said cup.

7. A connecter for yieldably connecting two members comprising: a substantially circular relatively shallow pressed metal cup having a shank projecting therefrom for fixing to one of said connected members, a conical metal head inserted within said cup in spaced relation therewith and having a shank projecting from the opening in said cup for fixing to the other of said connected members, and elastic material isolating said head and cup and held compressed therebetween by an inward deformation of the periphery of said cup.

8. A yieldable connecter comprising: a metal outer cup, a metal inner cup inserted within said outer cup in opposed and interlocked relation therewith so as to form a pocket between said cups, non-metallic elastic material held highly compressed within said pocket, and oppositely extending shanks fixed to said outer and inner cups respectively.

9. A yieldable connecter comprising: a metal outer cup, a metal inner cup inserted within said outer cup in opposed relation therewith so as to form a pocket between said cups, non-metallic elastic material encasing said inner cup and filling said pocket and held highly compressed by an overlapping relation between said cups.

10. A yieldable connecter comprising: a metal outer cup, a metal inner cup inserted within said outer cup in opposed relation therewith so as to form a pocket between said cups, elastic rubber material filling said pocket and isolating said cups and held under compression by said outer cup being bent radially inwardly toward said inner cup.

11. A yieldable connecter comprising: a metal outer cup, an outwardly flaring inner metal cup inserted within said outer cup in opposed relation therewith forming a pocket therebetween, elastic non-metallic material filling said pocket and extending around and encasing said inner cup, said elastic material being held compressed by the side walls of said outer cup being bent radially inwardly.

12. The steps in the method of making a flexible connecter comprising: assembling a soft rubber member between an outer metal casing member and an inner metal member so as to isolate said metal members, forcing said metal members toward each other to substantialy compress the soft rubber therebetween, and then closing the side walls of said metal casing member inwardly by deforming the metal to cause it to partially overlie said inner metal member and maintain said metal members in clamped together relation.

13. The steps in the method of making a flexible connecter comprising: assembling a soft rubber member between an outer metal cup and an opposed inner metal member so as to isolate said members, forcing said metal members toward each other to compress the soft rubber therebetween, and while so held forced together closing in the side walls of the metal cup to further compress the soft rubber between said metal members and maintain said parts in clamped relationship.

14. The steps in the method of making a flexible connecter comprising: assembling a soft rubber member between an outer metal cup and an opposed inner metal member so as to isolate said members, forcing said metal members toward each other to compress the soft rubber therebetween and cause it to partially flow outwardly around the periphery of said inner metal member, and then while so forced together, closing in the side walls of said cup by deforming the metal thereof to cause said side walls to partially overlie said inner member and so maintain said metal members forced together upon said rubber.

15. The steps in the method of making a flexible connecter comprising: assembling a soft rubber member between an outer metal cup and an opposed smaller inner metal cup so as to isolate said cups, forcing said cups toward each other to compress the rubber therebetween and cause a partial flow into the space exterior of the inner cup, then deforming the metal side walls of the outer cup to partially overlie the inner cup and so retain said cups firmly clamped upon the rubber.

16. The steps in the method of making a flexible connecter comprising: assembling a soft rubber member between an outer metal cup and an opposed smaller inner metal cup so as to isolate said cups, forcing said cups toward each other to compress the rubber therebetween and cause a partial flow into the space exterior of the inner cup, then corrugating the side walls of the outer cup to radially contract and clamp same upon the rubber lying between said walls and the exterior of the interior cup.

In testimony whereof I hereto affix my signature.

HARVEY D. GEYER.